US012278947B2

(12) United States Patent
Bae et al.

(10) Patent No.: US 12,278,947 B2
(45) Date of Patent: Apr. 15, 2025

(54) DECODER SIDE DISPLACEMENT VECTOR PREDICTION

(71) Applicant: Ofinno, LLC, Reston, VA (US)

(72) Inventors: Tae Meon Bae, McLean, VA (US); Esmael Hejazi Dinan, McLean, VA (US); Kalyan Goswami, Reston, VA (US)

(73) Assignee: Ofinno, LLC, Reston, VA (US)

( * ) Notice: Subject to any disclaimer, the term of this patent is extended or adjusted under 35 U.S.C. 154(b) by 213 days.

(21) Appl. No.: 17/519,788

(22) Filed: Nov. 5, 2021

(65) Prior Publication Data

US 2022/0150471 A1    May 12, 2022

Related U.S. Application Data

(60) Provisional application No. 63/110,454, filed on Nov. 6, 2020.

(51) Int. Cl.
*H04N 19/00* (2014.01)
*H04N 19/105* (2014.01)
*H04N 19/159* (2014.01)
*H04N 19/176* (2014.01)
*H04N 19/46* (2014.01)
*H04N 19/52* (2014.01)

(52) U.S. Cl.
CPC ......... *H04N 19/105* (2014.11); *H04N 19/159* (2014.11); *H04N 19/176* (2014.11); *H04N 19/46* (2014.11); *H04N 19/52* (2014.11)

(58) Field of Classification Search
CPC ..................................................... H04N 19/00
See application file for complete search history.

(56) References Cited

U.S. PATENT DOCUMENTS

| 2011/0176611 | A1 | 7/2011 | Huang et al. | |
|---|---|---|---|---|
| 2018/0270485 | A1* | 9/2018 | Jang | H04N 19/503 |
| 2022/0086441 | A1* | 3/2022 | Zhang | H04N 19/176 |

OTHER PUBLICATIONS

Tsang et al.; Decoder Side Merge Mode and AMVP in HEVC Screen Content Coding; 2017 IEEE International Conference on Image Processing (ICIP); Sep. 17-20, 2017; pp. 260-264; IEEE.
Sullivan et al.; Overview of the High Efficiency Video Coding (HEVC) Standard; IEEE Transactions on Circuits and Systems for Video Technology, vol. 22, No. 12, Dec. 2012; pp. 1649-1668.
Xu et al.; Intra Block Copy in HEVC Screen Content Coding Extensions; IEEE Journal on Emerging and Selected Topics in Circuits and Systems; Published 2016; pp. 1-11.

(Continued)

*Primary Examiner* — Maryam A Nasri
(74) *Attorney, Agent, or Firm* — Willis H. Chang; Kavon Nasabzadeh; Jacob L. Mangan

(57) ABSTRACT

A decoder may generate, for each of a plurality of displacement vectors, a prediction of a neighboring region of a block. The decoder may determine, based on the predictions of the neighboring region of the block, a first displacement vector from the plurality of displacement vectors for the neighboring region. The decoder may generate, based on a first predictor candidate list and the first displacement vector, a second predictor candidate list. The decoder may decode a second displacement vector based on: the second predictor candidate list; and signaling information, in a video bitstream, for the block.

20 Claims, 22 Drawing Sheets

(56) References Cited

OTHER PUBLICATIONS

Liu et al.; Industrial Technology Advances Overview of HEVC extensions on screen content coding; Sep. 22, 2015; pp. 1-12.
Bross et al.; Document: JVET-Q2001-vA; Joint Video Experts Team (JVET) of ITU-T SG 16 WP 3 and ISO/IEC JTC 1/SC 29/WG 11; 17th Meeting: Brussels, BE; Jan. 7-17, 2020; Title: Versatile Video Coding (Draft 8); Status: Output document approved by JVET; Purpose: Draft text of video coding specification.

\* cited by examiner ns are completed, but could
have additional steps not included in a figure. A process may# DECODER SIDE DISPLACEMENT VECTOR PREDICTION

CROSS-REFERENCE TO RELATED APPLICATIONS

This application claims the benefit of U.S. Provisional Application No. 63/110,454, filed Nov. 6, 2020, which is hereby incorporated by reference in its entirety.

BRIEF DESCRIPTION OF THE DRAWINGS

Examples of several of the various embodiments of the present disclosure are described herein with reference to the drawings.

DETAILED DESCRIPTION

Figure 1:
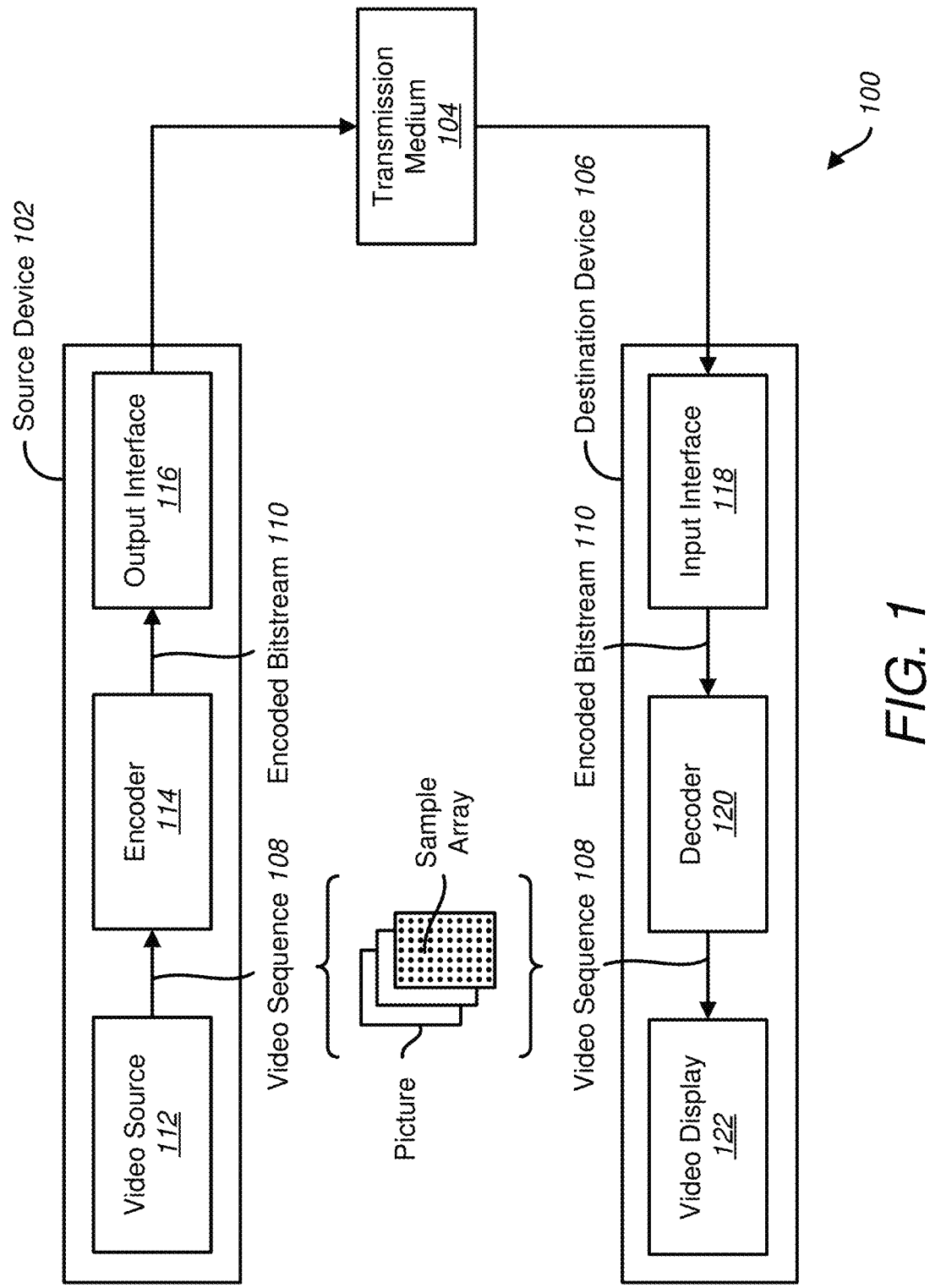
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into an encoded bitstream 110 for more efficient storage and/or transmission. Source device 102 may store and/or transmit encoded bitstream 110 to destination device 106 via transmission medium 104. Destination device 106 decodes encoded bitstream 110 to display video sequence 108. Destination device 106 may receive encoded bit stream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into encoded bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into encoded bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a reference block) may then be used to predict the block being encoded. For spatial prediction, encoder 114 may form a reference block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a reference block. The prediction error may represent non-redundant information that may be transmitted to a decoder for accurate decoding of a video sequence.

Encoder 114 may apply a transform to the prediction error (
e.g. a discrete cosine transform (DCT)) to generate transform coefficients. Encoder 114 may form encoded bitstream 110 based on the transform coefficients and other information used to determine reference blocks (e.g., prediction types, motion vectors, and prediction modes). In some examples, encoder 114 may perform one or more of quantization and entropy coding of the transform coefficients and/or the other information used to determine reference blocks before forming encoded bitstream 110 to further reduce the number of bits needed to store and/or transmit video sequence 108.

Output interface 116 may be configured to write and/or store encoded bitstream 110 onto transmission medium 104 for transmission to destination device 106. In addition or alternatively, output interface 116 may be configured to transmit, upload, and/or stream encoded bitstream 110 to destination device 106 via transmission medium 104. Output interface 116 may comprise a wired and/or wireless transmitter configured to transmit, upload, and/or stream encoded bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode encoded bitstream 110 into video sequence 108 for display, destination device 106 may comprise an input interface 118, a decoder 120, and a video display 122. Input interface 118 may be configured to read encoded bitstream 110 stored on transmission medium 104 by source device 102. In addition or alternatively, input interface 118 may be configured to receive, download, and/or stream encoded bitstream 110 from source device 102 via transmission medium 104. Input interface 118 may comprise a wired and/or wireless receiver configured to receive, download, and/or stream encoded bitstream 110 according to one or more proprietary and/or standardized communication protocols, such as those mentioned above.

Decoder 120 may decode video sequence 108 from encoded bit stream 110. To decode video sequence 108, decoder 120 may generate reference blocks for pictures of video sequence 108 in a similar manner as encoder 114 and determine prediction errors for the blocks. Decoder 120 may generate the reference blocks using prediction types, prediction modes, and/or motion vectors received in encoded bit stream 110 and determine the prediction errors using transform coefficients also received in encoded bit stream 110. Decoder 120 may determine the prediction errors by weighting transform basis functions using the transform coefficients. Decoder 120 may combine the reference blocks and prediction errors to decode video sequence 108. In some examples, decoder 120 may decode a video sequence that approximates video sequence 108 due to, for example, lossy compression of video sequence 108 by encoder 114 and/or errors introduced into encoded bit stream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 104 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
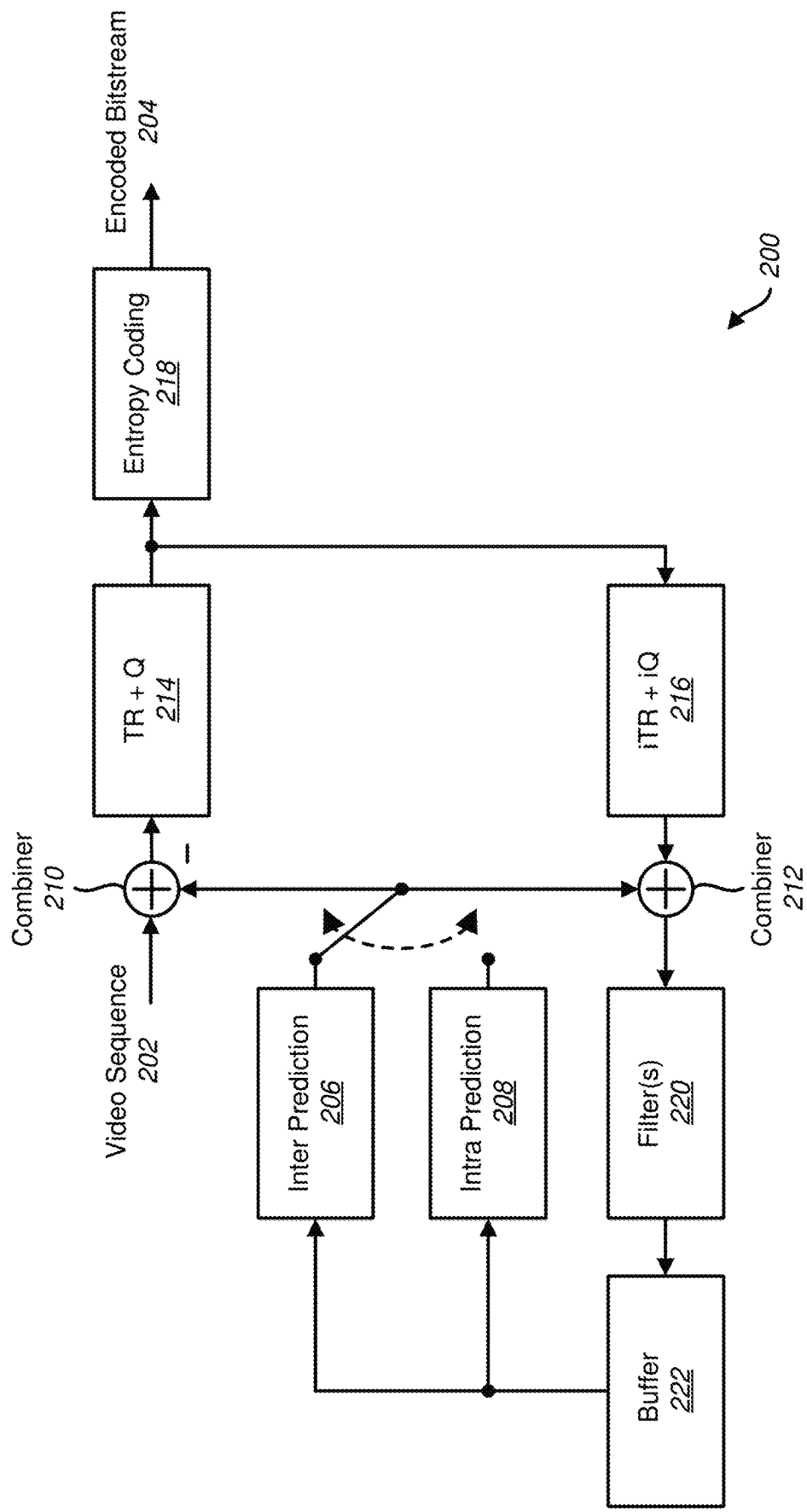
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into an encoded bitstream 224 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a reference block) may then be used to predict the block being encoded to remove redundant information. Inter prediction unit 206 may exploit temporal redundancy or similarities in scene content from picture to picture in video sequence 202 to determine the reference block. For example, scene content between pictures of video sequence 202 may be similar except for differences due to motion or affine transformation of the screen content over time.

Intra prediction unit 208 may perform intra prediction by forming a reference block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the reference block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the reference block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in encoded bitstream 224. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form encoded bitstream 224.

Inverse transform and quantization unit 216 may inverse quantize and inverse transform the quantized transform coefficients to determine a reconstructed prediction error. Combiner 212 may combine the reconstructed prediction error with the reference block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that encoded bitstream 224 is generated in conformance with the requirements of any one of a number of proprietary or industry video coding standards. For example, the encoder control unit may control the one or more units of encoder 200 such that encoded bitstream 224 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of encoded bitstream 224 and maximize or increase the reconstructed video quality. For example, the encoder control unit may attempt to minimize or reduce the bitrate of encoded bitstream 224 given a level that the reconstructed video quality may not fall below, or attempt to maximize or increase the reconstructed video quality given a level that the bit rate of encoded bitstream 224 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form encoded bitstream 224.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
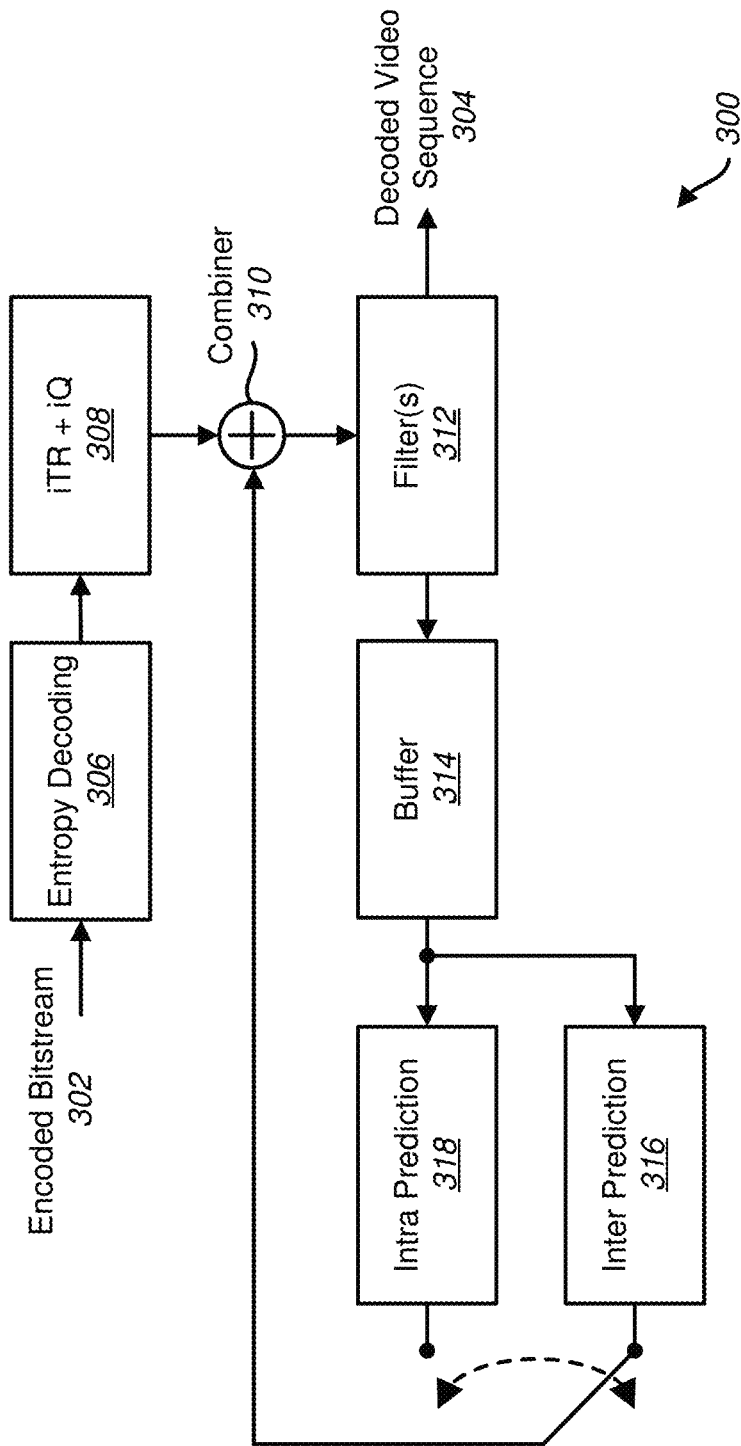
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an encoded bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that encoded bitstream 302 is decoded in conformance with the requirements of any one of a number of proprietary or industry video coding standards. For example, The decoder control unit may control the one or more units of decoder 300 such that encoded bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in encoded bitstream 302.

Entropy decoding unit 306 may entropy decode the encoded bitstream 302. Inverse transform and quantization unit 308 may inverse quantize and inverse transform the quantized transform coefficients to determine a decoded prediction error. Combiner 310 may combine the decoded prediction error with a reference block to form a decoded block. The reference block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in encoded bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more reference blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
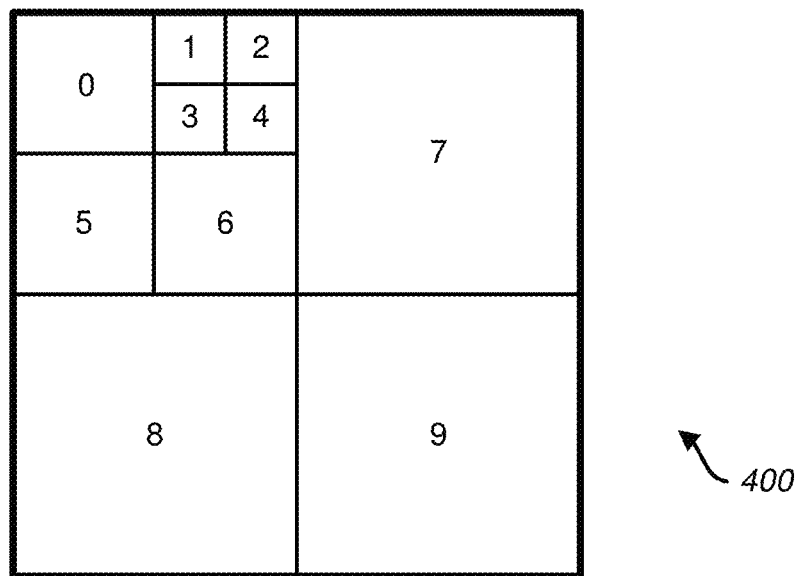
FIG. 4 illustrates an example quadtree partitioning of a coding tree block (CTB) in accordance with embodiments of the present disclosure.
Figure 5:
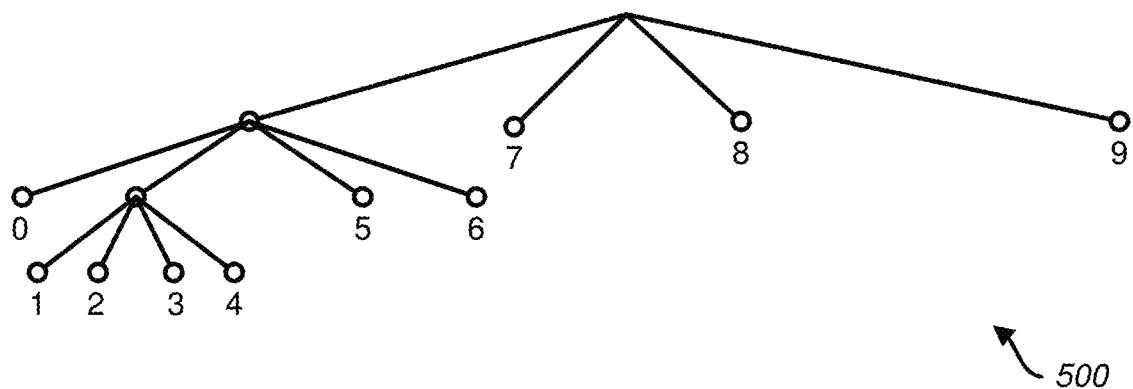
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
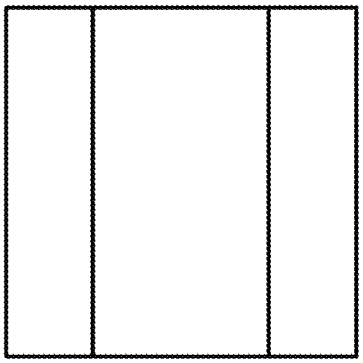
FIG. 6 illustrates example binary and ternary tree partitions in accordance with embodiments of the present disclosure.
Figure 6:
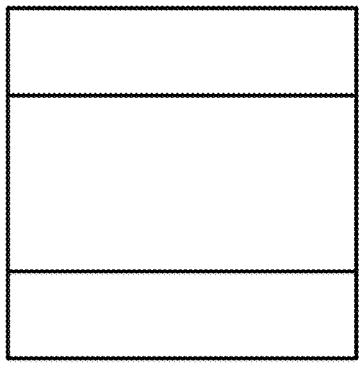
Figure 6:
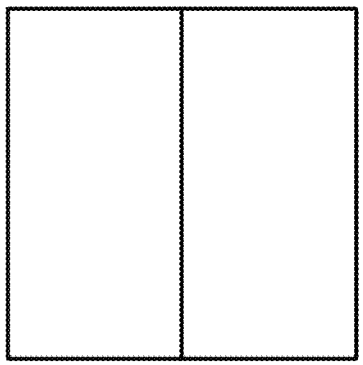
Figure 6:
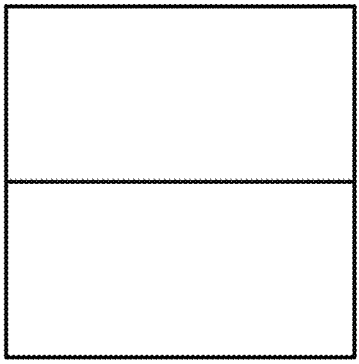

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
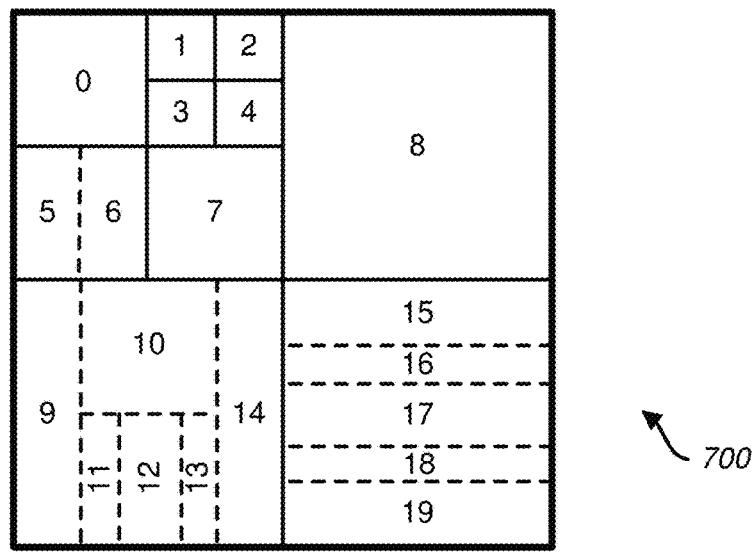
FIG. 7 illustrates an example quadtree+multi-type tree partitioning of a CTB in accordance with embodiments of the present disclosure.
Figure 8:
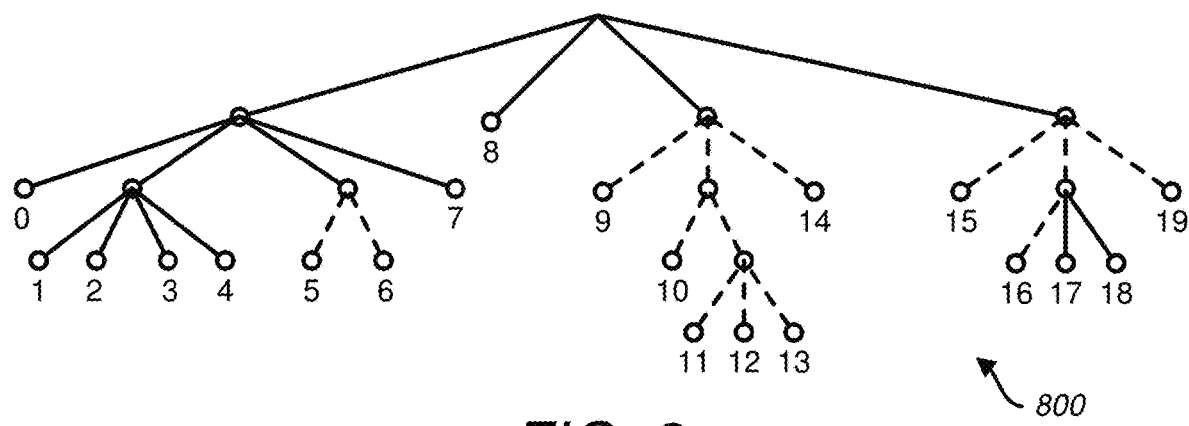
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

Figure 9:
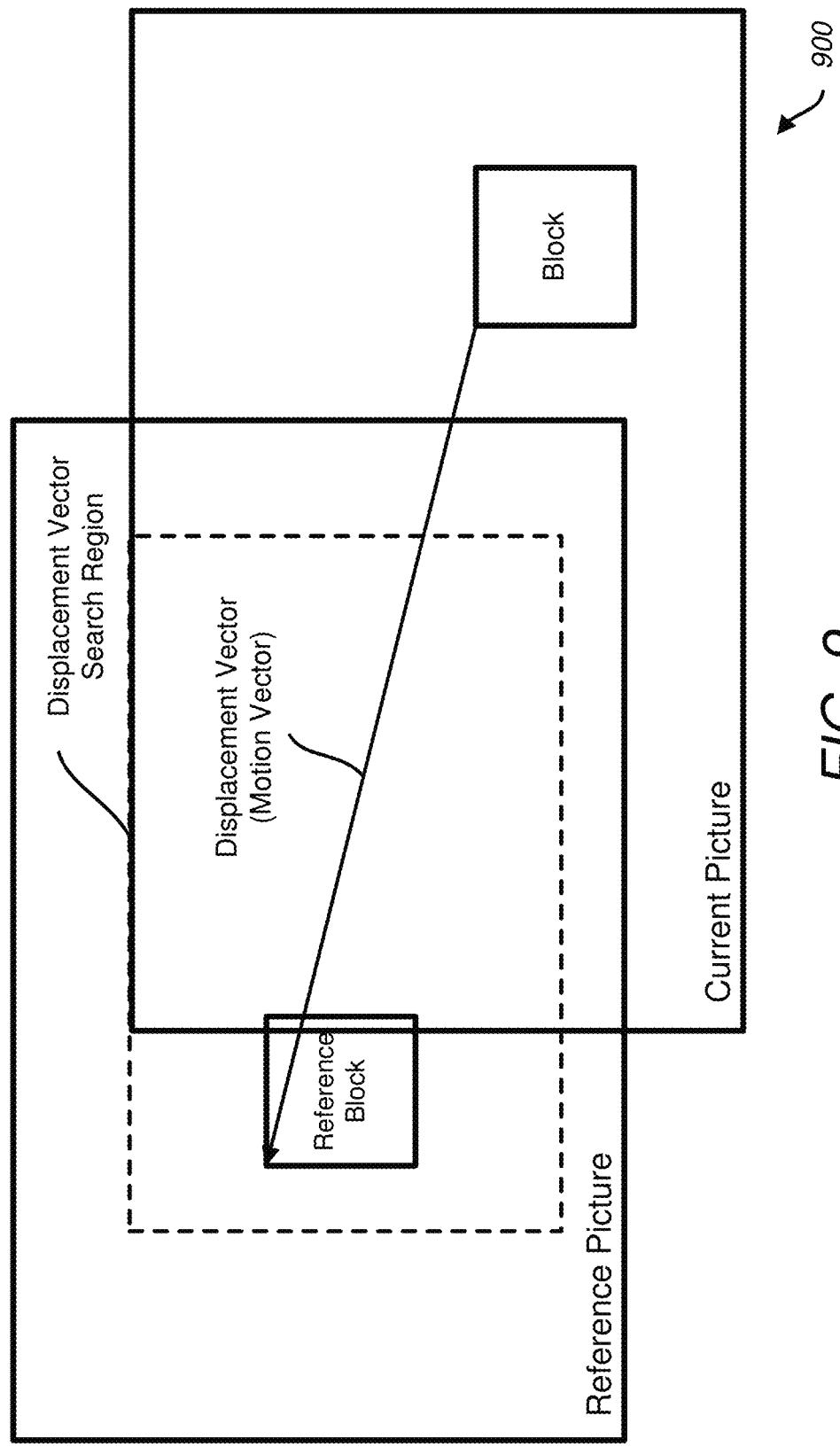
FIG. 9 illustrates an example of a reference block used for inter prediction mode, where the top left sample position of the reference block is depicted by a displacement vector (motion vector) from the top left sample position of a block being encoded in the reference picture in accordance with embodiments of the present disclosure.
Figure 10:
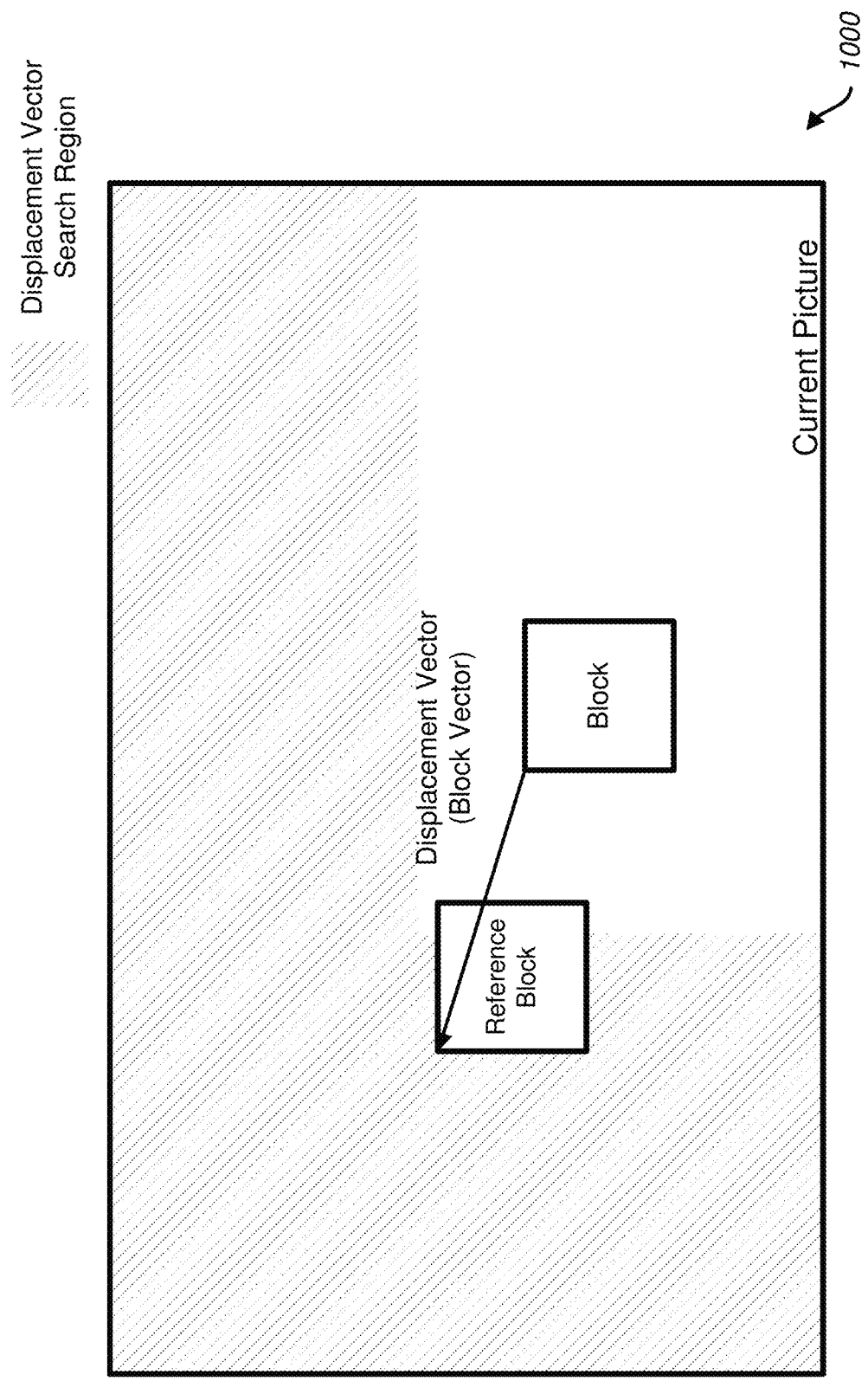
FIG. 10 illustrates an example of a reference block used for intra block copy mode, where the top left sample position of reference block is depicted by a displacement vector (block vector) from the top left sample position of a block being encoded in the same picture in accordance with embodiments of the present disclosure.

In inter prediction mode and intra block copy mode, a block being encoded (also referred to as a current block) may be predicted by a block based displacement vector. A block based displacement vector is estimated by searching the reference block that is similar to the current block from a reference candidate blocks (also referred to blocks in the displacement vector search region in the reference picture). To measure the similarity between blocks, SAD (Sum of Absolute Difference) or SSD (Sum of Squared Difference) may be used. The reference block in inter prediction mode or intra block copy mode may be signaled by a displacement vector (also referred as motion vector in inter prediction mode and block vector in intra block copy mode) that shows the direction and distance from the current block to the reference block. FIG. 9 shows an example of the displacement vector (motion vector) in inter prediction mode, where the reference block indicated by the displacement vector resides in a different picture of the current block. FIG. 10 shows an example of the displacement vector (block vector) in intra block copy mode, where the reference block indicated by the displacement vector with respect to the current block resides in the same picture as the current block.

To enhance the compression efficiency, the displacement vector is predicted from a displacement vector predictor candidate list that comprises the displacement vectors of temporally or spatially neighboring blocks of the current block. A predicted displacement vector (also referred to as a displacement vector predictor) and a prediction error (also referred to as a displacement vector difference) are signaled to the decoder. If the displacement vector predictor is accurate, the length of the displacement vector difference is smaller than the length of the displacement vector. Thus, signaling the displacement vector difference is more efficient than signaling the displacement vector. The displacement vector predictor may be signalled by a displacement vector predictor index, which is an index of the displacement vector predictor in the displacement vector predictor candidate list. If the number of candidates is increased the prediction accuracy can be enhanced, but it may also increase the required bits to signal the displacement vector predictor index. Thus, current encoders such as HEVC and VVC restrict the number of the displacement vector predictor candidates.

Figure 11:
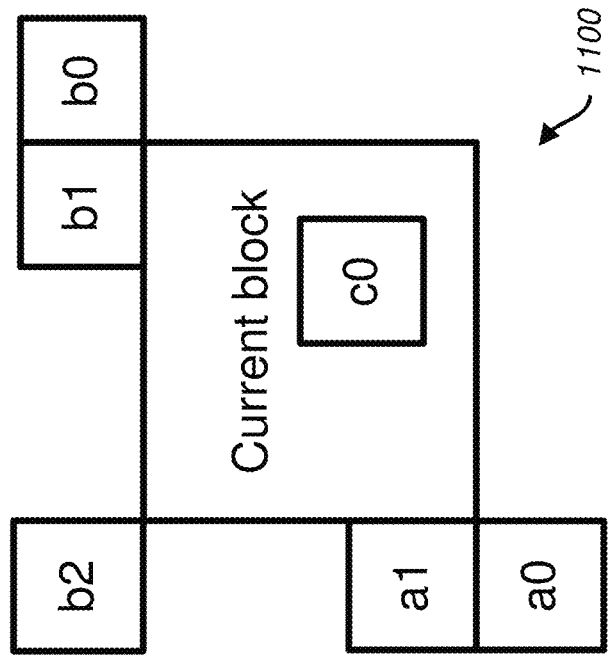
FIG. 11 illustrates an example of a displacement vector predictor candidates for motion and block vector in accordance with embodiments of the present disclosure.

FIG. 11 illustrates an example of the spatial and temporal displacement vector predictor candidates of the current block in HEVC. The pre-encoded displacement vectors of spatially neighboring blocks of the current block may be the displacement vector predictor candidates in inter prediction mode or intra block copy mode. The displacement vector of the collocated block in a previously encoded picture may be the displacement vector predictor candidate in inter prediction mode. Among the displacement vectors of neighboring blocks a0, a1, b0, b1, and b2 in FIG. 11, maximum two displacement vectors of neighboring blocks can be included in the displacement vector predictor candidates. The upper neighboring block a0 and left neighboring block b0 are first checked its availability. If a0 is not encoded with the same mode of the current block, a1 block is checked as a next candidate. Similarly, if b0 is not encoded with the same mode of the current block, b1, b2 blocks are checked as a next candidate sequentially. In addition, the displacement vector in temporally collocated block c0 may be considered as the displacement vector predictor candidate. Zero motion vector may be considered as the displacement vector predictor candidate if the number of displacement vector predictor candidate is less then pre-defined number.

Figure 12:
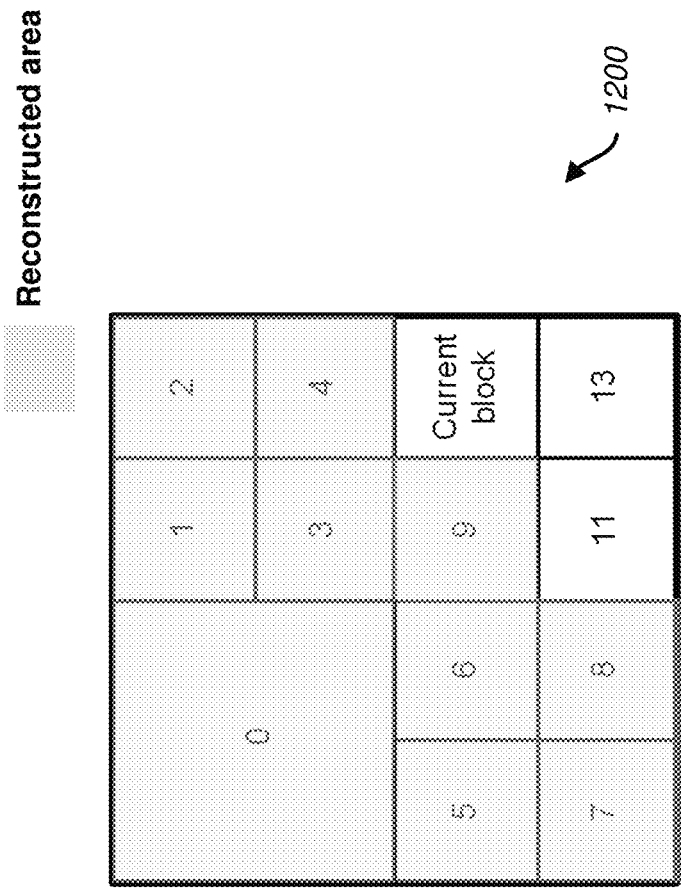
FIG. 12 illustrates an example of displacement vector predictor candidates for a block being encoded vector in accordance with embodiments of the present disclosure.

FIG. 12 illustrates an example of history based displacement vector predictor candidates in intra block copy mode in HEVC SCC extension. In FIG. 12, the number of each block represents the encoding order (also referred to as z-scan order) and the displacement vectors of blocks whose z-scan order are smaller than the current block may be used as the displacement vector predictor candidates. The latest buffered displacement vector predictor candidate may be used when the number of available displacement vector predictor candidates are less than pre-defined number of displacement vector predictor candidates.

The displacement vector used for prediction in inter prediction mode or intra block copy mode may be constructed by adding the displacement vector predictor and the displacement vector difference in Advanced Motion Vector Prediction mode. In merge mode, the displacement vector predictor is used as the displacement vector.

A neighboring region based displacement vector estimation was proposed to predict the displacement vectors without utilizing the samples of the current block being encoded. Because the displacement vector estimation can be performed in decoder side, bits for signaling displacement vectors are saved.

Figure 13:
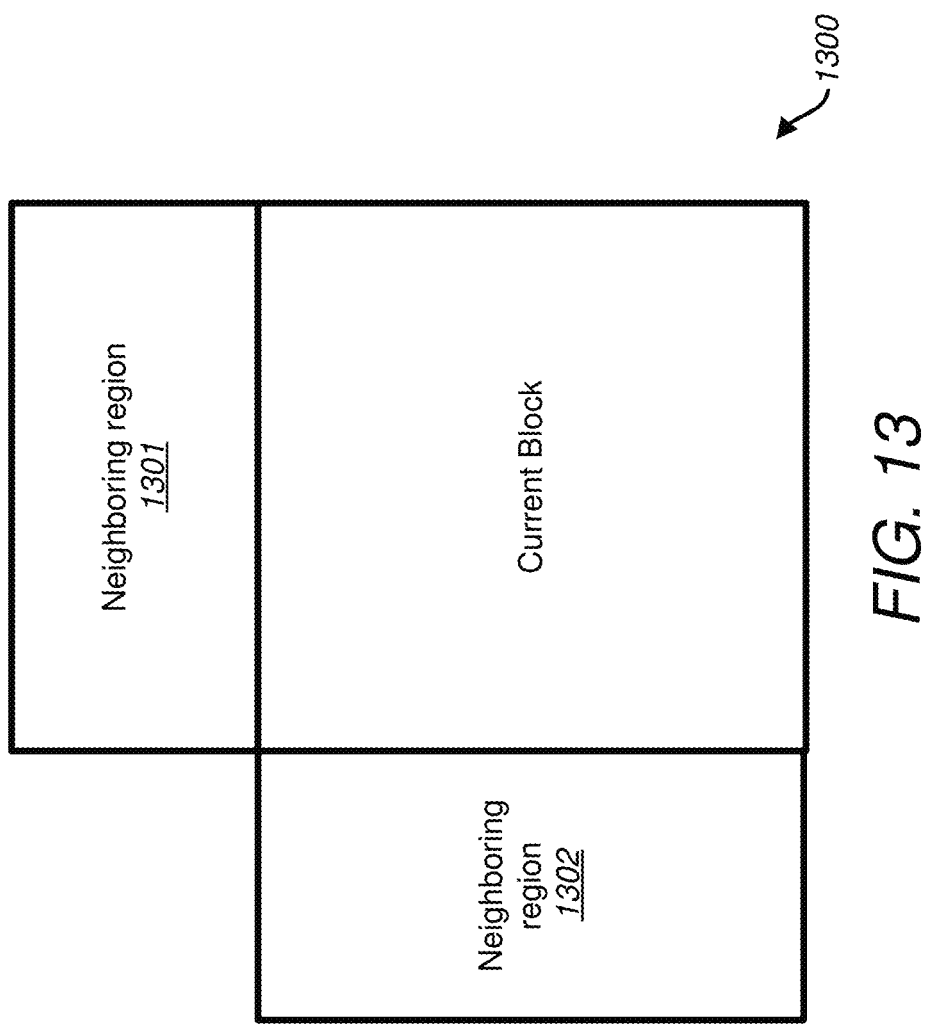
FIG. 13 illustrates an example of a neighboring region for a block being encoded in accordance with embodiments of the present disclosure.

FIG. 13 illustrates an example of neighboring region of blocks. The neighboring region resides the upper and left of a block, therefore they are also available in decoding the current block in a decoder. The SAD (or SSD) between neighboring regions of the current block and reference candidate blocks may be used as the prediction of SAD (or SSD) between the current block and the reference candidate blocks instead.

Figure 14:
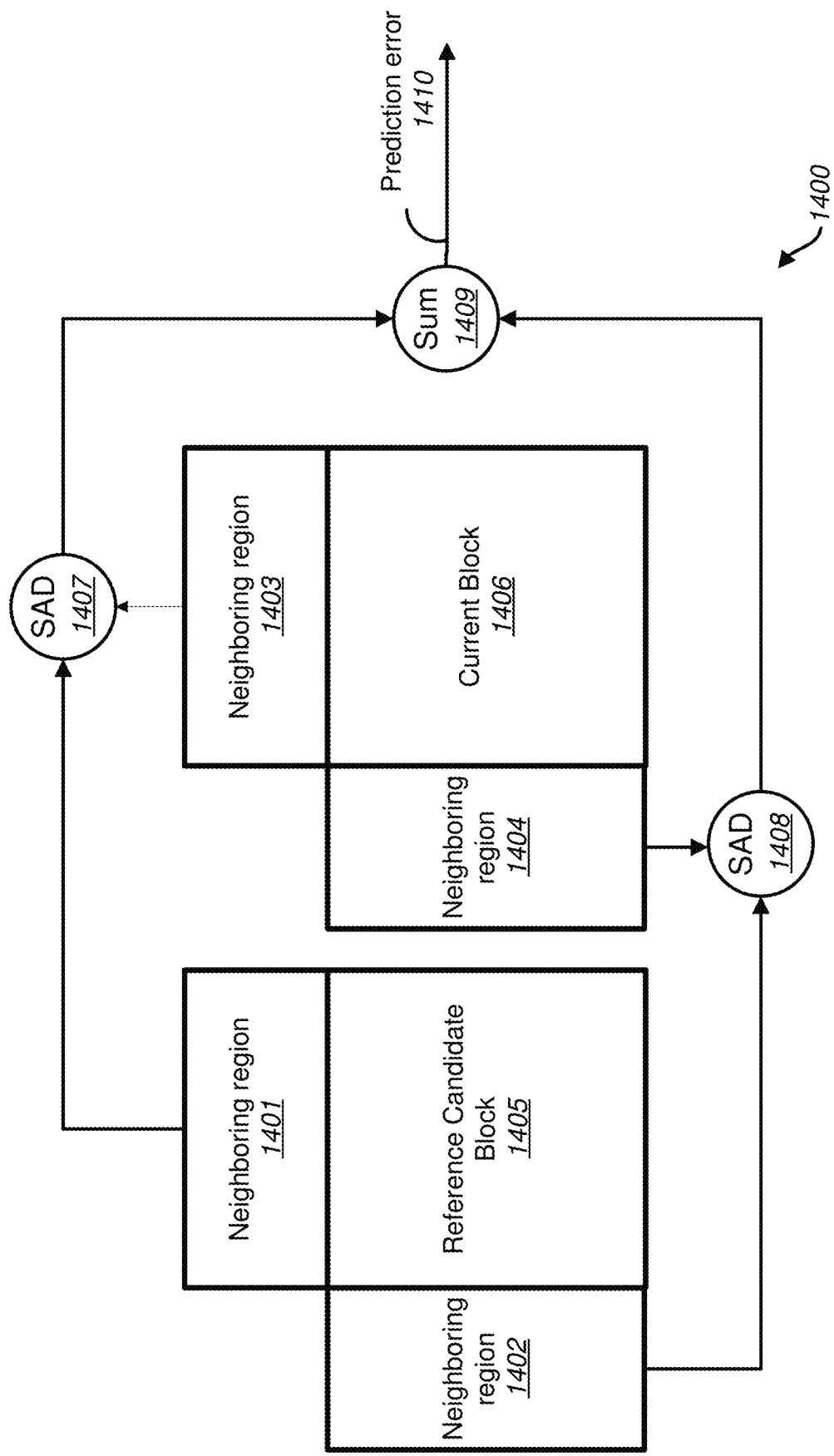
FIG. 14 illustrates an example of a method to estimate prediction error between the reference block and a block being encoded using neighboring regions of the reference block and the block being encoded in accordance with embodiments of the present disclosure.

FIG. 14 illustrates the prediction of SAD between the current block and a reference candidate block in the neighboring region based displacement vector estimation. First, the SAD between upper neighboring region 1401 of the reference candidate block 1405 and the upper neighboring region 1403 of the current block 1406 is calculated. Similarly, the SAD between left neighboring region 1402 of the reference candidate block 1405 and the upper neighboring region 1404 of the current block 1406 is calculated. Then the sum of SADs 1407, 1408 is used as the prediction of SAD between the reference candidate block 1405 and the current block 1406. Among the reference candidate blocks, a reference candidate block that shows minimum prediction of SAD (or SSD) may be chosen as the reference block.

In existing technologies, the compression efficiency of signaling the displacement vector (motion vector or block vector) depends on the accuracy of the displacement vector predictor. If the displacement vector predictor is not accurate signaling bits for the displacement vector difference may increase. Therefore, a new method that predict more accurate displacement vector predictor can help enhancing compression efficiency.

Embodiments of the present disclosure are related to a process for increasing the accuracy of the displacement vector predictor to enhance compression efficiency of displacement vector signaling in inter mode and intra block copy mode. Embodiments of the present disclosure may perform a neighboring region based displacement vector estimation and add the resulting predicted displacement vector to a displacement vector predictor candidate list at an encoder and decoder. A displacement vector predictor may be selected among the displacement vector predictors within the candidate list that shows a smallest distance (e.g., L1 distance) to the displacement vector found by a block based displacement vector estimation. For compression efficiency, a flag that enables the proposed method may exist for each block or for each group of pictures. For example, if the ratio of the neighboring region based displacement vector estimation is higher than the ratio of conventional block based displacement vector estimation, signalling the flag per block may be more efficient than on a per group of pictures basis. These and other features of the present disclosure are described further below.

Figure 15:
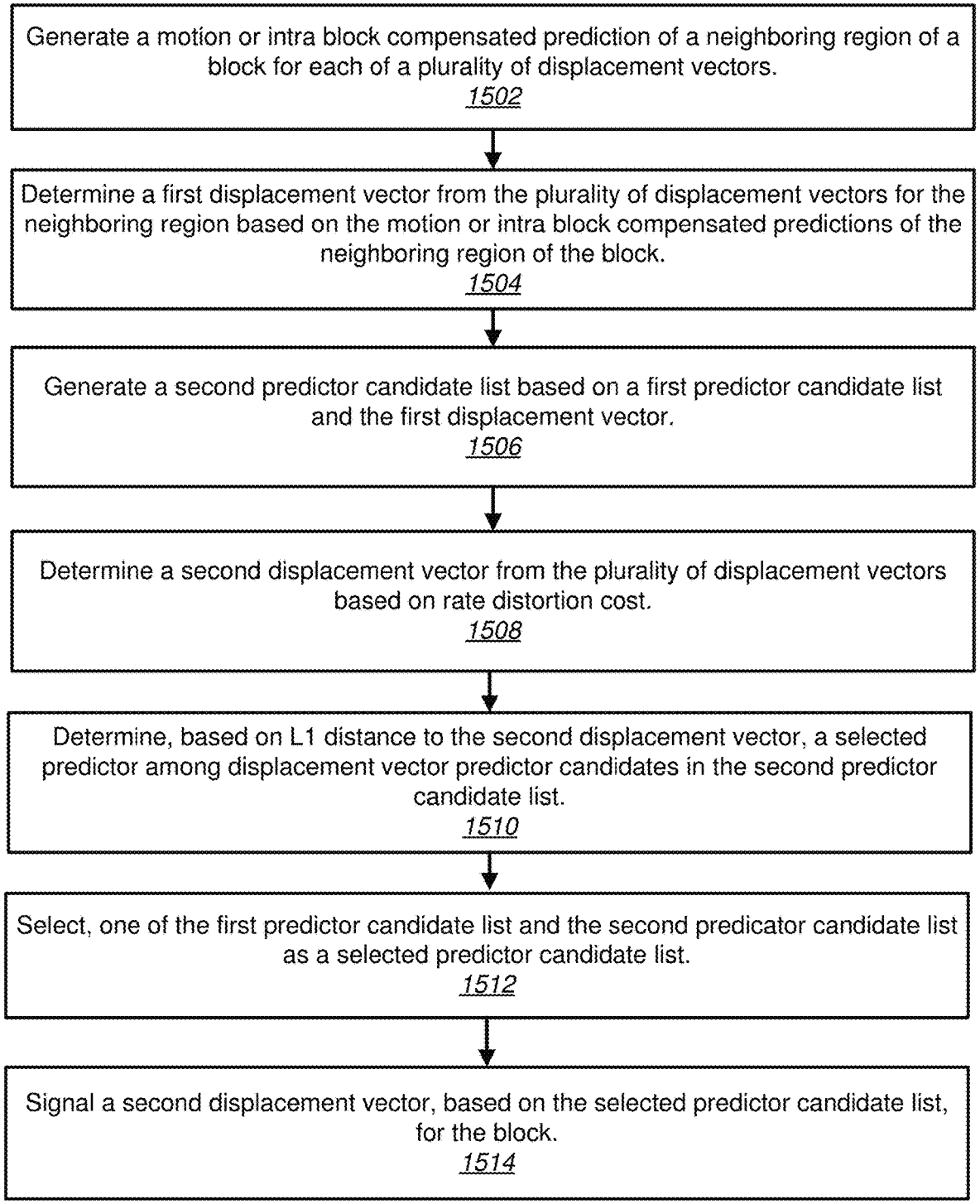
FIG. 15 illustrates a flowchart of a method for a displacement vector prediction in accordance with embodiments of the present disclosure.

FIG. 15 illustrates a flowchart 1500 of a method for decoder-side displacement vector prediction and signaling in accordance with embodiments of the present disclosure. The method of flowchart 1500 may be implemented by an encoder, such as encoder 200 in FIG. 2.

The method of flowchart 1500 begins at 1502. At 1502, neighboring regions of reference candidate blocks are used as a compensated prediction of the neighboring regions of a current block being encoded to predict similarity between the current block and reference candidate blocks.

At 1504, a displacement vector that indicates a reference candidate block that shows minimum predicted SAD (or SAE) may be chosen as a first displacement vector.

At 1506, a second predictor candidate list may be generated based on a first predictor candidate list that comprises the spatial, temporal, and historical displacement vector predictor candidates The first displacement vector may be appended to the second predictor candidate as a last element.

At 1508, a second displacement vector may be determined by the block based displacement vector estimation, among displacement vectors in a search range based on a rate distortion cost.

At 1510, a selected predictor may be determined based on a distance (e.g., L1 distance) to a second displacement vector determined by the block based displacement vector estimation among displacement vector predictor candidates in the second predictor candidate list.

At 1512, a selected predictor candidate list may be chosen between the first displacement vector predictor candidate list and the second displacement vector predictor candidate list based on the selected predictor.

At 1514, the second displacement vector may be signaled for the block based on a selected predictor candidate list.

Figure 16:
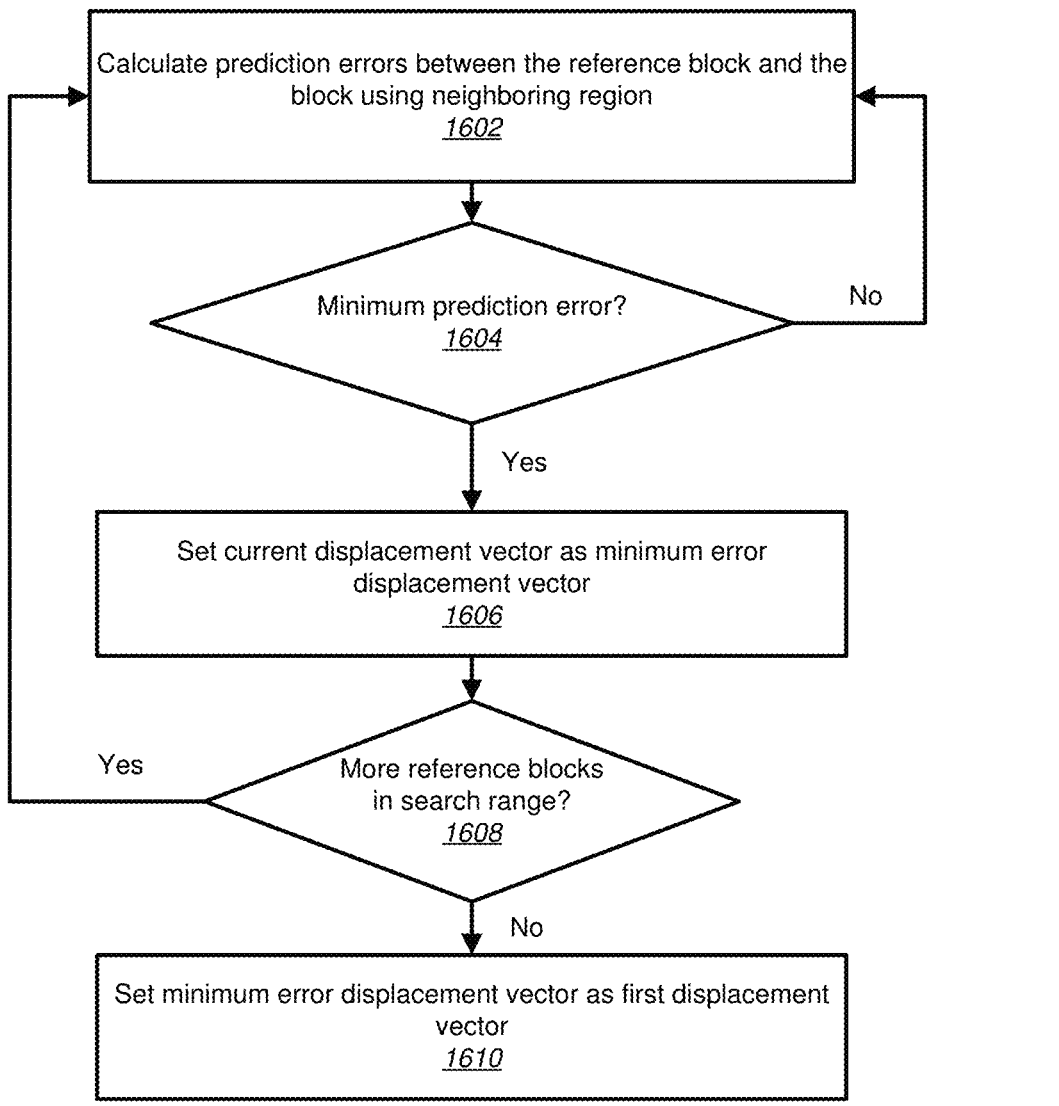
FIG. 16 illustrates a flowchart of a method for generating a first displacement vector in accordance with embodiments of the present disclosure.

FIG. 16 illustrates an example of determining the first displacement vector based on the neighboring region based displacement vector estimation. At 1602, a difference (e.g., SAD or SAE) between neighboring regions of the reference candidate block and a block being encoded (also referred as a current block) may be calculated. At 1604 and 1606, a minimum error displacement vector may be updated if the SAD value at 1602 shows a minimum difference. 602, 1604, and 1606 may be repeated for all reference candidate blocks in the search range, which are checked at 1608. At 1610, the minimum error displacement vector may be determined as the first displacement vector.

Figure 17:
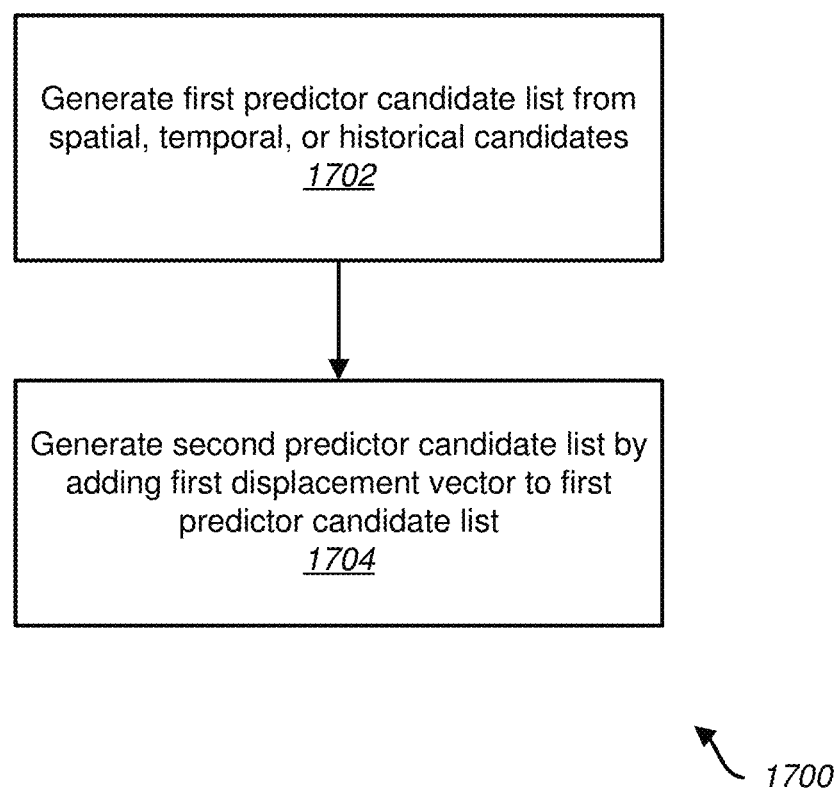
FIG. 17 illustrates a flowchart of a method for generating a second predictor candidate list in accordance with embodiments of the present disclosure.

FIG. 17 illustrates a flowchart 1700 of a method of generating the second predictor candidate list. At 1702, the first predictor candidate list comprising spatial, temporal, and historical displacement vector candidates may be included in the second predictor candidate list. At 1704, the first displacement vector may be additionally included in the second predictor candidate list.

Figure 18:
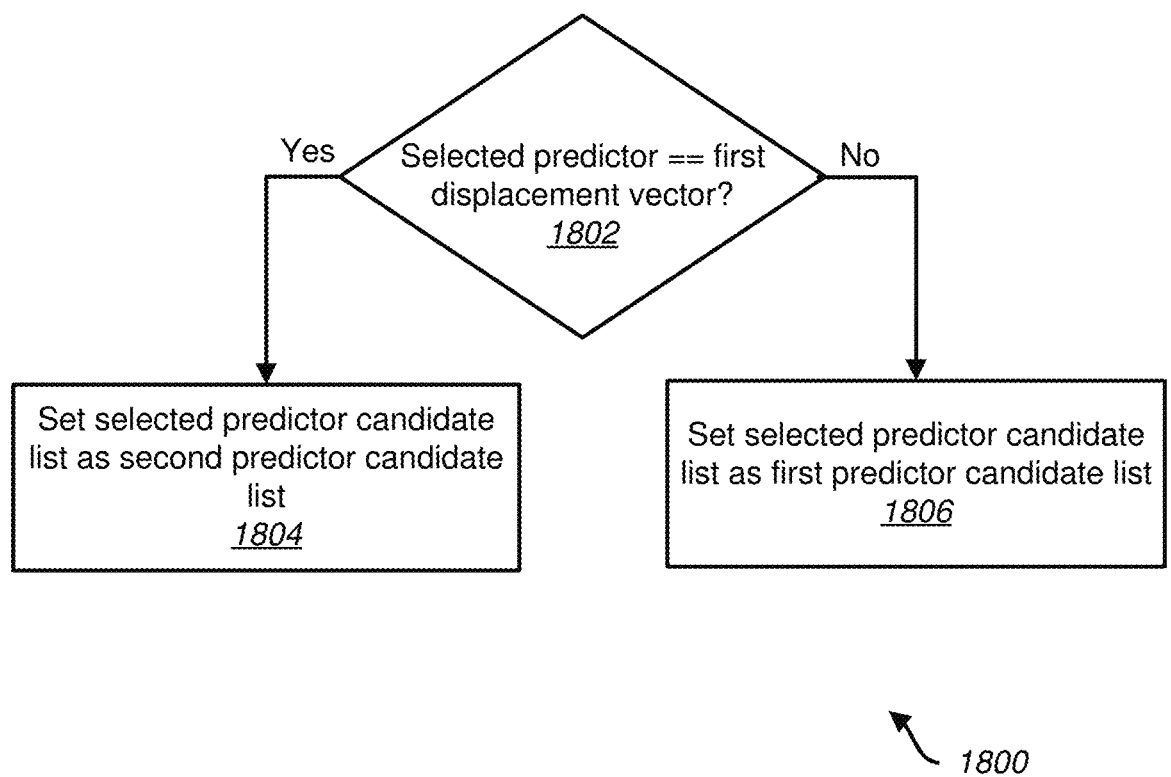
FIG. 18 illustrates a flowchart of a method for selecting, one of the first predictor candidate list and the second predicator candidate list as a selected predictor candidate list in accordance with embodiments of the present disclosure.

FIG. 18 illustrates a flowchart 1800 of a method of determining a selected predictor candidate list as described above in FIG. 15. At 1802, the selected predictor and the first displacement vector may be compared. If the selected predictor is equal to the first displacement vector, the second predictor candidate list may be determined as the selected predictor candidate list at 1804. Otherwise, the first predictor candidate list may be determined as the selected predictor candidate list at 1806.

Figure 19:
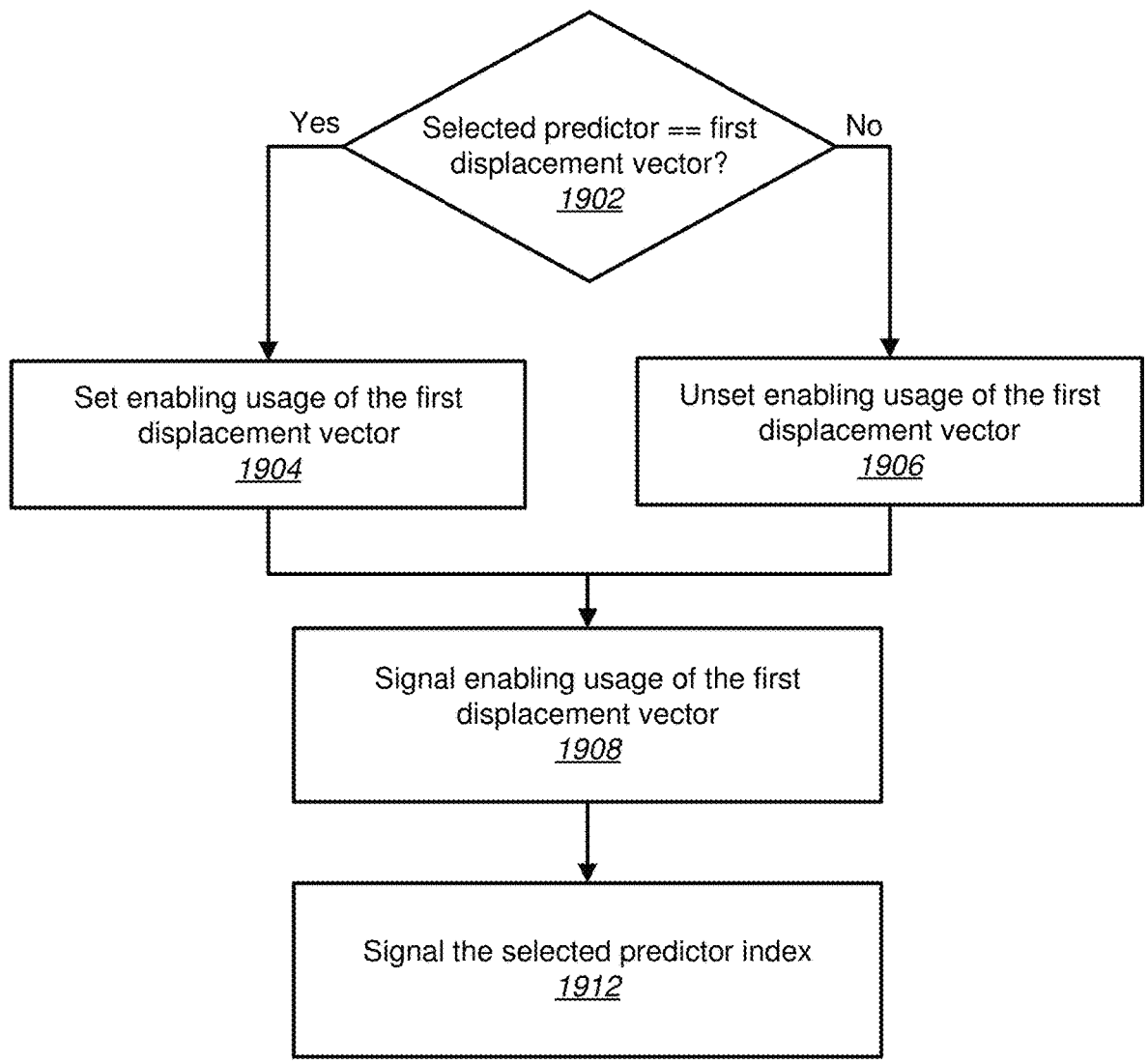
FIG. 19 illustrates a flowchart of a method for signaling a displacement vector predictor in accordance with embodiments of the present disclosure.

FIG. 19 illustrates a flowchart 1900 of a method for signaling the second displacement vector in accordance with embodiments of the present disclosure. At 1902, the selected predictor and the first displacement vector may be compared. If the selected predictor and the first displacement vector are identical, the flag at 1904, enabling usage of the first displacement vector, may be set (e.g., set equal to a value of one). Otherwise, the flag, enabling usage of the first displacement vector, may be unset (e.g., set equal to a value of zero) at 1906. The flag, enabling usage of the first displacement vector may be signaled at 1908, and the index of selected predictor in the selected predictor candidate list is signaled at 1910.

Figure 20:
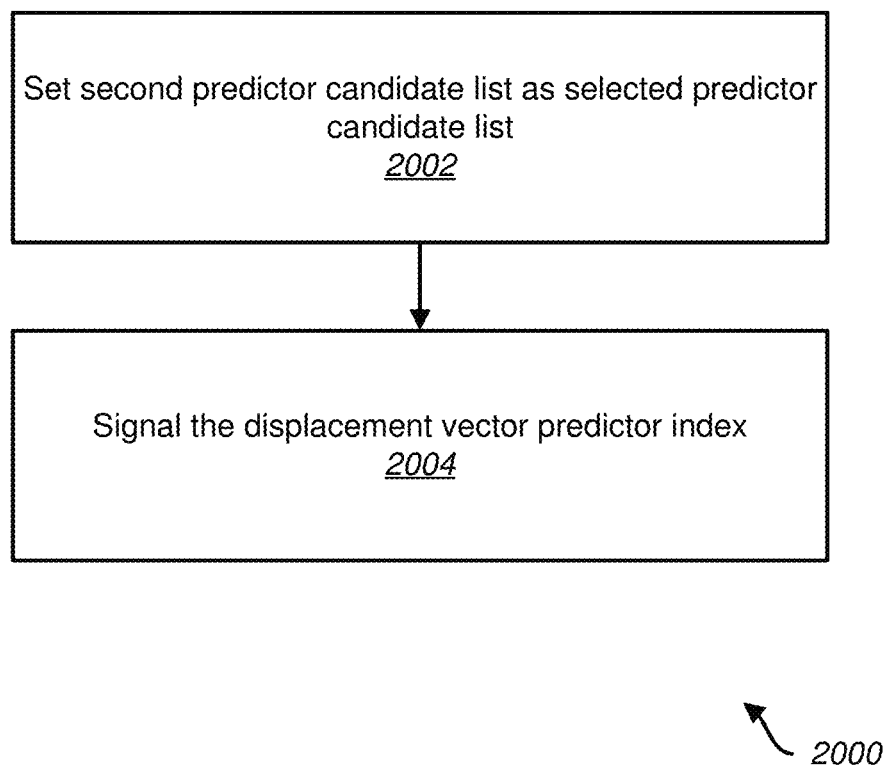
FIG. 20 illustrates a flowchart of a method for signaling a displacement vector predictor in accordance with embodiments of the present disclosure.

FIG. 20 illustrates another flowchart 2000 of a method for signaling the second displacement vector in accordance with embodiments of the present disclosure. At 2002, the second predictor candidate list is chosen as the selected predictor candidate list. And then, at 2004, the index of selected predictor in the selected predictor candidate list is signaled. The flag, enabling usage of the first displacement vector is set not for each block but for each group of pictures.

Figure 21:
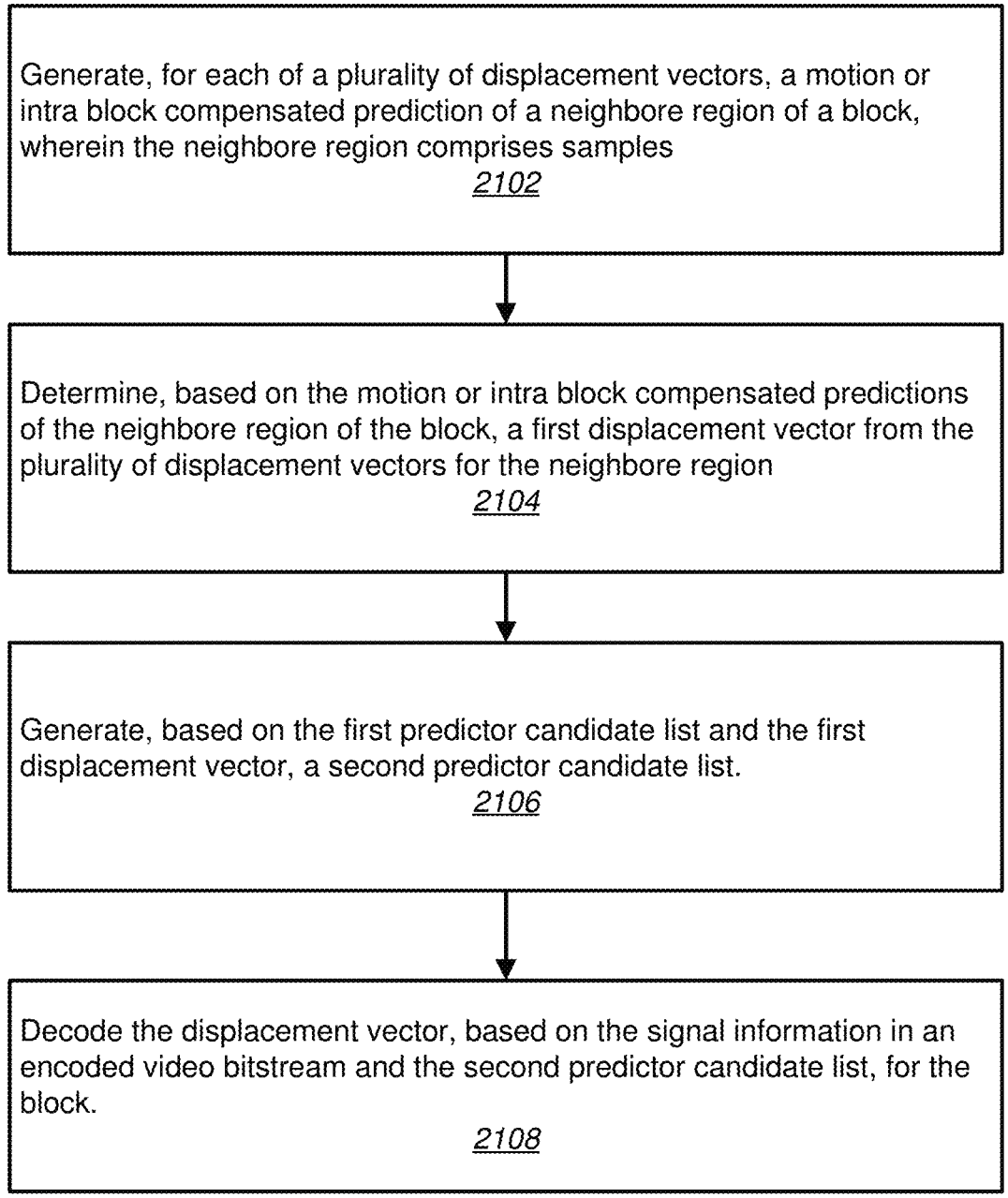
FIG. 21 illustrates a flowchart of a method for decoding a displacement vector predictor in accordance with embodiments of the present disclosure in the decoder.

FIG. 21 illustrates a flowchart 2100 of a method for decoding displacement vector predictor in accordance with embodiments of the present disclosure. The method of flowchart 2100 may be implemented by a decoder, such as decoder 300 in FIG. 3. The method of flowchart 2100 begins at 2102. The procedure from 2102 to 2106 is the same as 1502 to 1506 in FIG. 15. Therefore, a first displacement vector predicted in a decoder may be exactly the same as the first displacement vector predicted in the encoder. At 2108, The displacement vector predictor may be decoded, based on the signal information in an encoded video bitstream and the second predictor candidate list, for the block.

Figure 22:
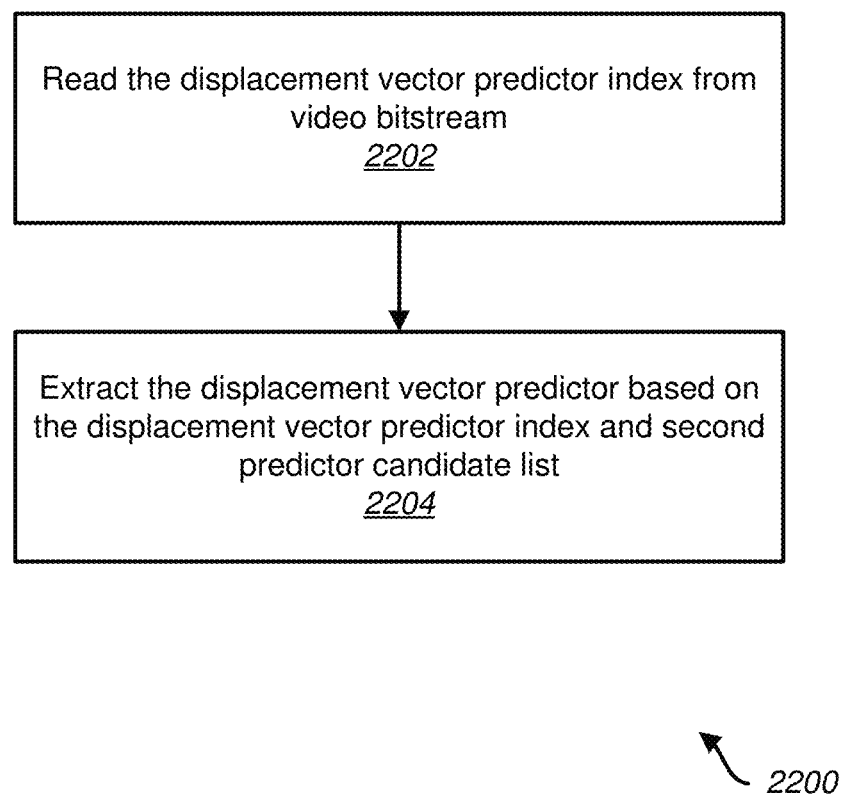
FIG. 22 illustrates a flowchart of decoding the displacement vector predictor in accordance with embodiments of the present disclosure.

FIG. 22 illustrates a flowchart of 2200 of a method of decoding the displacement vector predictor when a video bitstream is encoded with the method described in FIG. 18 in accordance with embodiments of the present disclosure. In FIG. 22, the displacement vector predictor may be decoded based on the video bitstream, the first displacement vector, and the second predictor candidate list. At 2202, the displacement vector predictor index may be read from the video bitstream. The element in the second predictor candidate list whose index is the same as the displacement vector predictor index may be assigned as the displacement vector predictor at 2204.

Figure 23:
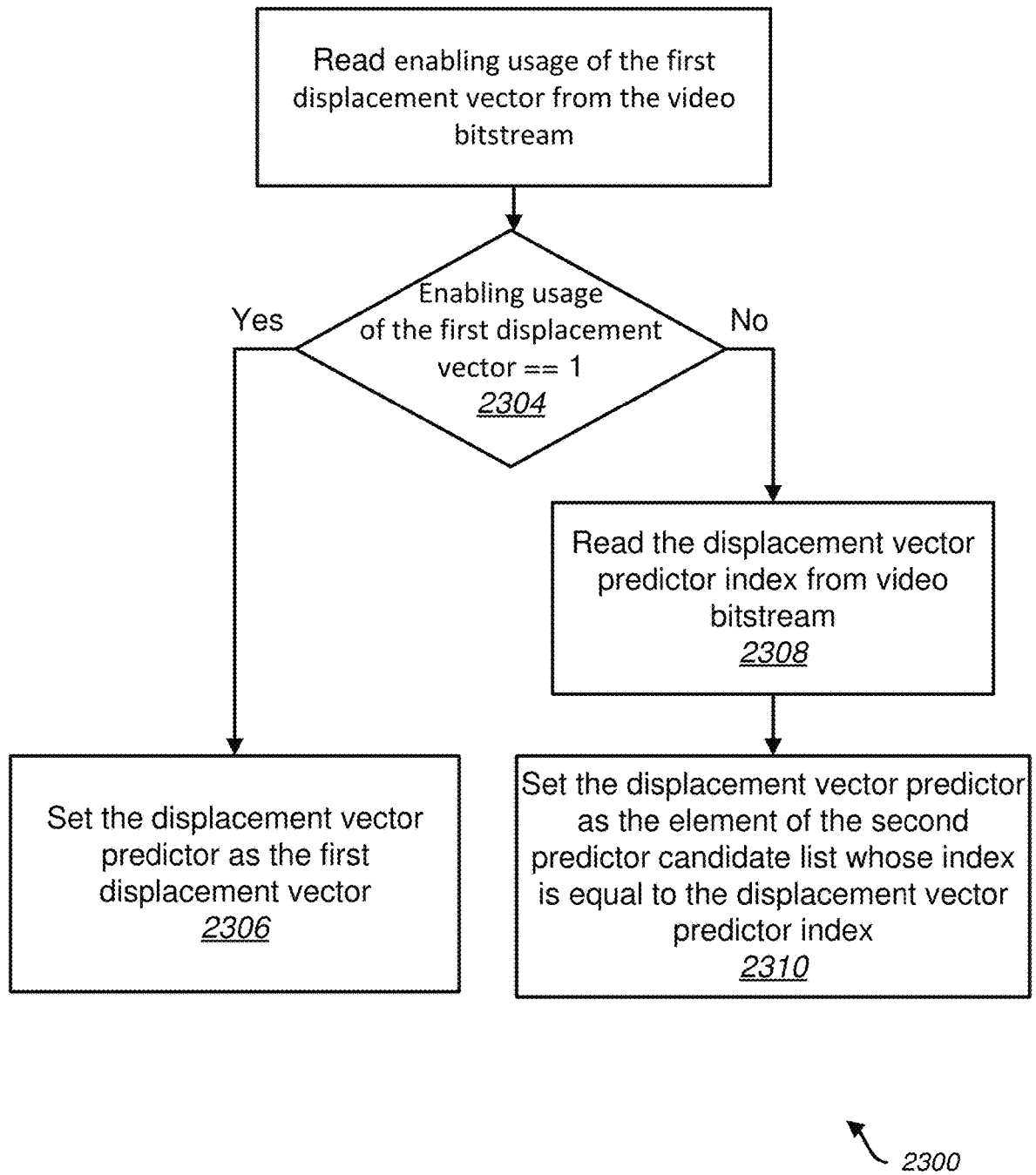
FIG. 23 illustrates a flowchart of decoding the displacement vector predictor in accordance with embodiments of the present disclosure.

FIG. 23 illustrates a flowchart of 2300 of a method of decoding the displacement vector predictor when a video bitstream is encoded with the method described in FIG. 19 in accordance with embodiments of the present disclosure. In FIG. 23, the displacement vector predictor may decoded based on the video bitstream, the first displacement vector, and the second predictor candidate list. At 2302, a flag, an enabling usage of the first displacement vector for the block to be decoded may be read from video bitstream. The flag may be checked at 2304, and if the flag is set (also referred as 1), the first displacement vector may be set as the displacement vector predictor at 2306. Otherwise, the element of the second predictor candidate list whose index is equal to the displacement vector predictor index may be set as the displacement vector predictor.

Figure 24:
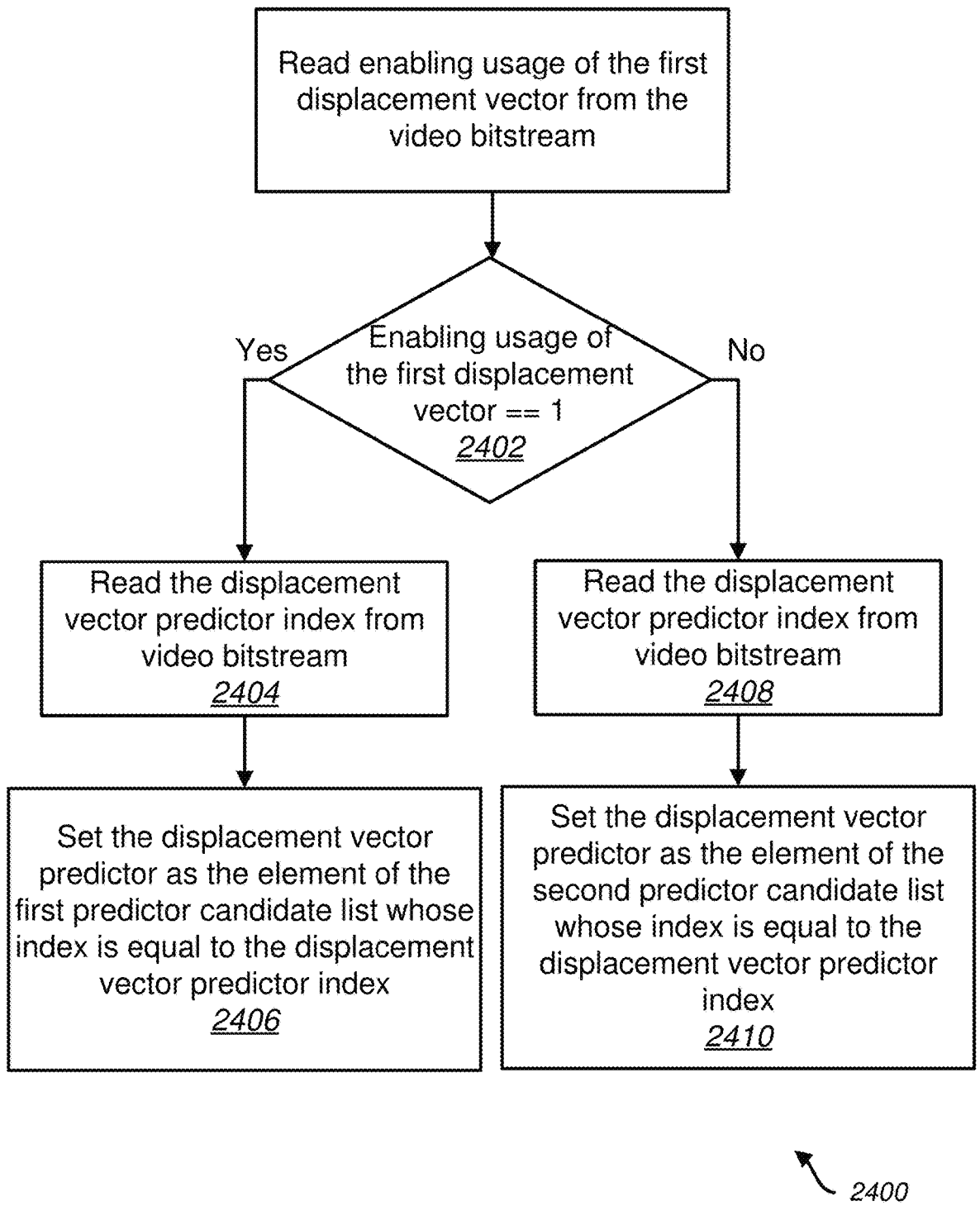
FIG. 24 illustrates a flowchart of a method of decoding a displacement vector predictor in accordance with embodiments of the present disclosure.

FIG. 24 illustrates a flowchart of 2400 of a method of decoding the displacement vector predictor when a video bitstream is encoded with the method described in FIG. 20 in accordance with embodiments of the present disclosure. In FIG. 24, the displacement vector predictor may be decoded based on the video bitstream, the first displacement vector, and the second predictor candidate list. At 2401, a flag, an enabling usage of the first displacement vector may be read from video bitstream, wherein the flag may reside in the picture header or picture parameter set or sequence parameter set but not exist for each block. The flag may be checked at 2402, and if the flag is set (also referred as 1), index of the displacement vector predictor may be read at 2404, then the candidate list element of the first predictor candidate list whose index is equal to the displacement vector predictor index may be set as the displacement vector predictor at 2406. Otherwise, index of the displacement vector predictor may be read at 2408, then the candidate list element of the second predictor candidate list whose index is equal to the displacement vector predictor index may be set as the displacement vector predictor at 2410.

Figure 25:
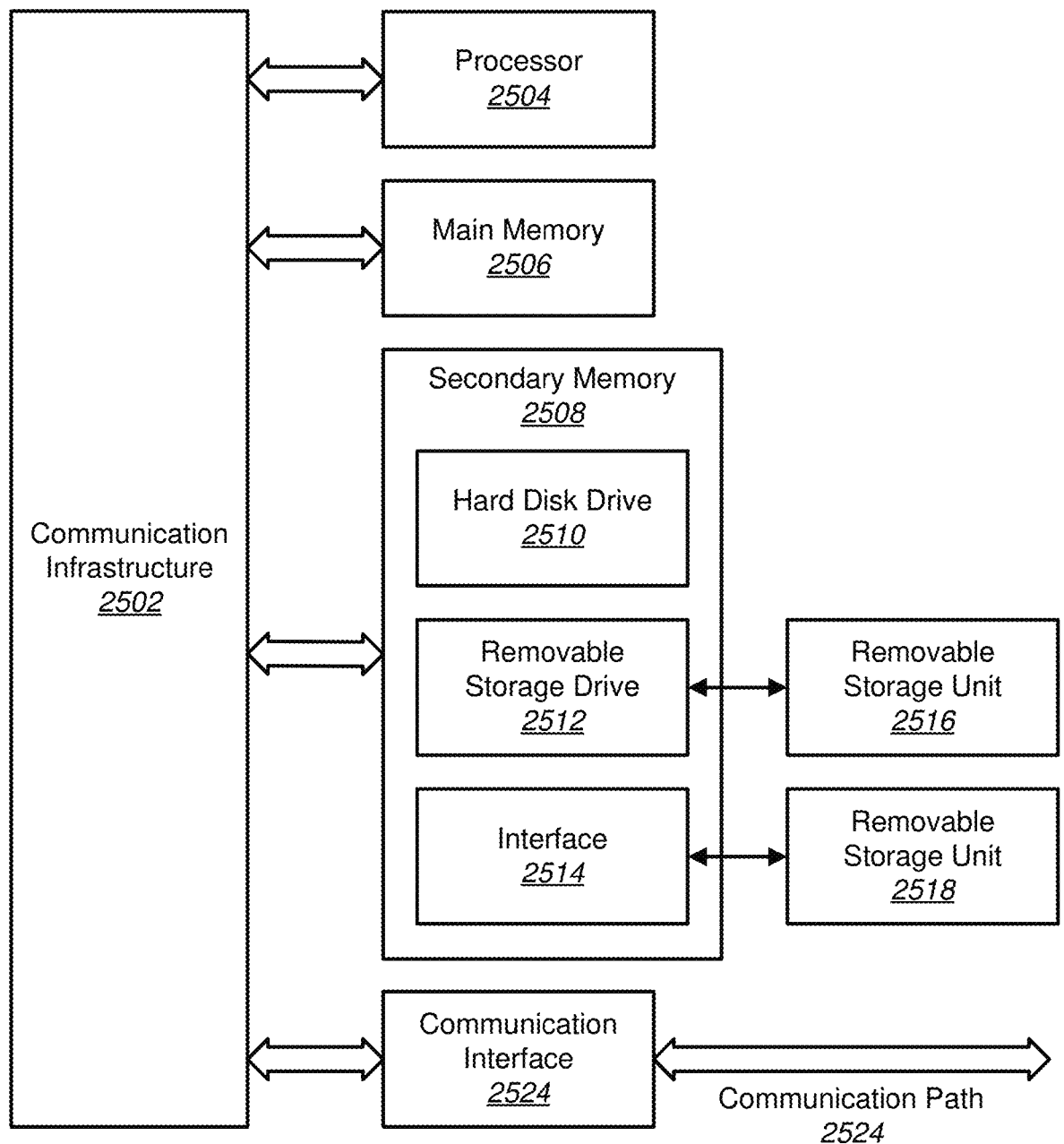
FIG. 25 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2500 is shown in FIG. 25. Blocks depicted in the figures above, such as the blocks in FIGS. 1, 2, and 3, may execute on one or more computer systems 2500. Furthermore, each of the steps of the flowcharts depicted in this disclosure may be implemented on one or more computer systems 2500.

Computer system 2500 includes one or more processors, such as processor 2504. Processor 2504 may be, for example, a special purpose processor, general purpose processor, microprocessor, or digital signal processor. Processor 2504 may be connected to a communication infrastructure 902 (for example, a bus or network). Computer system 2500 may also include a main memory 2506, such as random access memory (RAM), and may also include a secondary memory 2508.

Secondary memory 2508 may include, for example, a hard disk drive 2510 and/or a removable storage drive 2512, representing a magnetic tape drive, an optical disk drive, or the like. Removable storage drive 2512 may read from and/or write to a removable storage unit 2516 in a well-known manner. Removable storage unit 2516 represents a magnetic tape, optical disk, or the like, which is read by and written to by removable storage drive 2512. As will be appreciated by persons skilled in the relevant art(s), removable storage unit 2516 includes a computer usable storage medium having stored therein computer software and/or data.

In alternative implementations, secondary memory 2508 may include other similar means for allowing computer programs or other instructions to be loaded into computer system 2500. Such means may include, for example, a removable storage unit 2518 and an interface 2514. Examples of such means may include a program cartridge and cartridge interface (such as that found in video game devices), a removable memory chip (such as an EPROM or PROM) and associated socket, a thumb drive and USB port, and other removable storage units 2518 and interfaces 2514 which allow software and data to be transferred from removable storage unit 2518 to computer system 2500.

Computer system 2500 may also include a communications interface 2520. Communications interface 2520 allows software and data to be transferred between computer system 2500 and external devices. Examples of communications interface 2520 may include a modem, a network interface (such as an Ethernet card), a communications port, etc. Software and data transferred via communications interface 2520 are in the form of signals which may be electronic, electromagnetic, optical, or other signals capable of being received by communications interface 2520. These signals are provided to communications interface 2520 via a communications path 2522. Communications path 2522 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2516 and 2518 or a hard disk installed in hard disk drive 2510. These computer program products are means for providing software to computer system 2500. Computer programs (also called computer control logic) may be stored in main memory 2506 and/or secondary memory 2508. Computer programs may also be received via communications interface 2520. Such computer programs, when executed, enable the computer system 2500 to implement the present disclosure as discussed herein. In particular, the computer programs, when executed, enable processor 2504 to implement the processes of the present disclosure, such as any of the methods described herein. Accordingly, such computer programs represent controllers of the computer system 2500.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:

1. A method comprising:
receiving, by a decoder and from a video bitstream, a flag indicating whether decoder-side displacement vector prediction is enabled for a block;
for each reference candidate block of a plurality of reference candidate blocks indicated by a plurality of displacement vectors, comparing:
a neighboring region of the block; and
a neighboring region of the reference candidate block;
determining, based on the comparing and from the plurality of displacement vectors, a first displacement vector indicating a reference candidate block from the plurality of reference candidate blocks;
generating, based on the flag indicating the decoder-side displacement vector prediction is enabled, a second predictor candidate list comprising the first displacement vector added to a first predictor candidate list comprising one or more spatial or temporal displacement vector candidates; and
decoding a second displacement vector based on:
the second predictor candidate list; and
signaling information, in the video bitstream, for the block.

2. The method of claim 1, wherein the neighboring region of the block comprises samples:
above the topmost sample row and to the right of the left most sample column of the block; and
below the topmost sample row and to the left of the left most sample column of the block.

3. The method of claim 1, wherein the comparing, for the each reference candidate block of the plurality of reference candidate blocks, comprises determining a difference between the neighboring region of the block and the neighboring region of the reference candidate block, and wherein the first displacement vector is determined based on the reference candidate block with the minimum difference.

4. The method of claim 1, wherein the signaling information comprises a displacement vector predictor index that indicates a displacement predictor, in the second predictor candidate list, used to predict the second displacement vector.

5. The method of claim 1, wherein the second displacement vector is a motion vector of inter prediction mode or a block vector of intra block copy mode.

6. The method of claim 1, wherein the second predictor candidate list is an Advanced Motion Vector Prediction candidate list or a Merge mode candidate list.

7. The method of claim 1, wherein the flag is obtained from a picture header, a picture parameter set, or a sequence parameter set.

8. The method of claim 1, wherein the decoding the second displacement vector comprises:
selecting, based on the flag indicating the decoder-side displacement vector prediction is enabled, the second predictor candidate list from the first predictor candidate list and the second predictor candidate list.

9. A decoder comprising:
one or more processors and memory storing instructions that, when executed by the one or more processors, cause the decoder to:
receive, from a video bitstream, a flag indicating whether decoder-side displacement vector prediction is enabled for a block;
for each reference candidate block of a plurality of reference candidate blocks indicated by a plurality of displacement vectors, compare:
a neighboring region of the block; and
a neighboring region of the reference candidate block;
determine, based on the comparing and from the plurality of displacement vectors, a first displacement vector indicating a reference candidate block from the plurality of reference candidate blocks;
generate, based on the flag indicating the decoder-side displacement vector prediction is enabled, a second predictor candidate list comprising the first displacement vector added to a first predictor candidate list comprising one or more spatial or temporal displacement vector candidates; and
decode a second displacement vector based on:
the second predictor candidate list; and
signaling information, in the video bitstream, for the block.

10. The decoder of claim 9, wherein the neighboring region of the block comprises samples:
above the topmost sample row and to the right of the left most sample column of the block; and
below the topmost sample row and to the left of the left most sample column of the block.

11. The decoder of claim 9, wherein the comparing, for the each reference candidate block of the plurality of reference candidate blocks, comprises determining a difference between the neighboring region of the block and the neighboring region of the reference candidate block, and wherein the first displacement vector is determined based on the reference candidate block with the minimum difference.

12. The decoder of claim 9, wherein the signaling information comprises a displacement vector predictor index that indicates a displacement predictor, in the second predictor candidate list, used to predict the second displacement vector.

13. The decoder of claim 9, wherein the second displacement vector is a motion vector of inter prediction mode or a block vector of intra block copy mode.

14. The decoder of claim 9, wherein the second predictor candidate list is an Advanced Motion Vector Prediction candidate list or a Merge mode candidate list.

15. The decoder of claim 9, wherein the flag is obtained from a picture header, a picture parameter set, or a sequence parameter set.

16. The decoder of claim 9, wherein the to decode the second displacement vector, the decoder is further caused to:
select, based on the flag indicating the decoder-side displacement vector prediction is enabled, the second predictor candidate list from the first predictor candidate list and the second predictor candidate list.

17. A non-transitory computer-readable medium comprising instructions that, when executed by one or more processors of a decoder, cause the decoder to:
receive, from a video bitstream, a flag indicating whether decoder-side displacement vector prediction is enabled for a block;

for each reference candidate block of a plurality of reference candidate blocks indicated by a plurality of displacement vectors, compare:
　a neighboring region of the block; and
　a neighboring region of the reference candidate block;
determine, based on the comparing and from the plurality of displacement vectors, a first displacement vector indicating a reference candidate block from the plurality of reference candidate blocks;
generate, based on the flag indicating the decoder-side displacement vector prediction is enabled, a second predictor candidate list comprising the first displacement vector added to a first predictor candidate list comprising one or more spatial or temporal displacement vector candidates; and
decode a second displacement vector based on:
　the second predictor candidate list; and
　signaling information, in the video bitstream, for the block.

18. The non-transitory computer-readable medium of claim 17, wherein the neighboring region of the block comprises samples:
　above the topmost sample row and to the right of the left most sample column of the block; and
　below the topmost sample row and to the left of the left most sample column of the block.

19. The non-transitory computer-readable medium of claim 17, wherein the comparing, for the each reference candidate block of the plurality of reference candidate blocks, comprises determining a difference between the neighboring region of the block and the neighboring region of the reference candidate block, and wherein the first displacement vector is determined based on the reference candidate block with the minimum difference.

20. The non-transitory computer-readable medium of claim 17, wherein the signaling information comprises a displacement vector predictor index that indicates a displacement predictor, in the second predictor candidate list, used to predict the second displacement vector.

* * * * *